United States Patent
Kautz

(10) Patent No.: US 7,786,852 B2
(45) Date of Patent: Aug. 31, 2010

(54) METHOD AND SYSTEM FOR PREVENTING LEAVING A CHILD IN AN UNATTENDED VEHICLE

(76) Inventor: Greg C. Kautz, 2983 NE. Ivy La., Jensen Beach, FL (US) 34957-6605

( * ) Notice: Subject to any disclaimer, the term of this patent is extended or adjusted under 35 U.S.C. 154(b) by 345 days.

(21) Appl. No.: 12/051,622

(22) Filed: Mar. 19, 2008

(65) Prior Publication Data

US 2009/0237229 A1 Sep. 24, 2009

(51) Int. Cl.
*B60Q 1/00* (2006.01)
(52) U.S. Cl. .................. 340/457; 340/665; 340/666; 340/667; 340/573.1; 340/425.5
(58) Field of Classification Search ............ 340/457, 340/667, 666, 665, 425.5, 573.1; 180/272, 180/287; 701/44, 45
See application file for complete search history.

(56) References Cited

U.S. PATENT DOCUMENTS

| | | | |
|---|---|---|---|
| 5,793,284 A | 8/1998 | Teague | |
| 5,793,291 A | 8/1998 | Thornton | |
| 5,873,597 A | 2/1999 | Sim | |
| 5,949,340 A | 9/1999 | Rossi | |
| 5,966,070 A | 10/1999 | Thornton | |
| 6,028,509 A | 2/2000 | Rice | |
| 6,104,293 A | 8/2000 | Rossi | |
| 6,138,068 A | 10/2000 | Liu | |
| 6,263,272 B1 | 7/2001 | Liu et al. | |
| 6,489,889 B1 | 12/2002 | Smith | |
| 6,535,137 B1 | 3/2003 | Ryan | |
| 6,714,132 B2 | 3/2004 | Edwards et al. | |
| 6,727,823 B2 | 4/2004 | Ando et al. | |
| 6,792,339 B2 | 9/2004 | Basson et al. | |
| 6,812,844 B1 | 11/2004 | Burgess | |
| 6,870,472 B2 | 3/2005 | Gift et al. | |
| 6,909,365 B2 | 6/2005 | Toles | |
| 6,922,147 B1 | 7/2005 | Viksnins et al. | |
| 6,922,622 B2 | 7/2005 | Dulin et al. | |
| 6,924,742 B2 | 8/2005 | Mesina | |
| 6,930,614 B2 | 8/2005 | Rackham et al. | |
| 7,012,533 B2 * | 3/2006 | Younse | 340/573.1 |
| 7,106,203 B2 | 9/2006 | Edwards et al. | |
| 7,250,869 B2 * | 7/2007 | Davis | 340/573.1 |
| 2003/0038722 A1 | 2/2003 | Khairallah et al. | |
| 2003/0122662 A1 | 7/2003 | Quinonez | |
| 2005/0083190 A1 | 4/2005 | James | |
| 2005/0099285 A1 | 5/2005 | Prevatt et al. | |
| 2005/0200465 A1 | 9/2005 | Fabors et al. | |
| 2005/0225440 A1 | 10/2005 | Simmons et al. | |
| 2006/0033613 A1 | 2/2006 | Reece | |

(Continued)

*Primary Examiner*—Hung T. Nguyen
(74) *Attorney, Agent, or Firm*—Haynes and Boone, LLP

(57) ABSTRACT

A method is provided that includes determining whether a fastener of a child seat is fastened, determining whether a person is seated in a vehicle seat, and if it is determined that the fastener is fastened and the person is not seated in the vehicle seat: enabling a first notification signal of the alarm system, enabling a delay of the alarm system for a period of time, enabling a second notification signal of the alarm system if a door of the vehicle is locked within the period of time, and enabling the second notification signal after expiration of the period of time. If it is determined that the fastener is not fastened or the person is seated in the vehicle seat, the method includes resetting the alarm system.

20 Claims, 3 Drawing Sheets

U.S. PATENT DOCUMENTS

2006/0033634 A1 2/2006 Best
2006/0103516 A1 5/2006 Zang
2006/0139159 A1 6/2006 Lee et al.

* cited by examiner

METHOD AND SYSTEM FOR PREVENTING LEAVING A CHILD IN AN UNATTENDED VEHICLE

TECHNICAL FIELD

This invention relates in general to an alarm system, and more particularly, to a method and system to minimize or avoid the risk of leaving a child in an unattended vehicle.

BACKGROUND

Child safety seats are required by law when transporting young children in motor vehicles. Typically, the child seat is securely positioned in a back seat of the vehicle and the child secured in the child seat via a child seat safety belt. These laws have been established and strictly enforced to protect children from injury when being transported in motor vehicles. However, there have been instances where children have been left behind in unattended vehicles due to various circumstances. Unfortunately, some of these children have suffered serious injuries and in some cases even death, particularly during extreme temperature conditions in the summer and winter.

There have been numerous approaches that have been implemented to prevent leaving a child behind in an unattended vehicle. For example, one approach activates an alarm when a child seat is buckled and when the car key is removed from the ignition. Another approach includes a warning system for warning when a child has been left in an infant seat within a vehicle and when the vehicle door is opened. These approaches have not been satisfactory in all respects. Therefore, what is needed is an improved method and system to minimize or avoid the risk of leaving a child in an unattended vehicle.

SUMMARY

The invention encompasses a method for use with a child seat in a vehicle. In one embodiment, the method includes determining whether a fastener of the child seat is fastened; determining whether a person is seated in a vehicle seat; if it is determined that the fastener is fastened and the person is not seated in the vehicle seat: enabling a first notification signal of an alarm system, enabling a delay of the alarm system for a period of time, enabling a second notification signal of the alarm system if a door of the vehicle is locked within the period of time, and enabling the second notification signal after expiration of the period of time; and if it is determined that the fastener is not fastened or the person is seated in the vehicle seat, resetting the alarm system.

The invention further encompasses a system for use with a child seat in a vehicle. The system includes a first detector for detecting whether a fastener of a child seat is fastened; a second detector for detecting whether a person is seated in a vehicle seat; a third detector for detecting whether a door of the vehicle is locked; and a controller that is configured to: determine whether the fastener of the child seat is fastened; determine whether the person is seated in the vehicle seat; if it is determined that the fastener is fastened and the person is not seated in the vehicle seat: enable a first notification signal of an alarm system, enable a delay of the alarm system for a period of time, enable a second notification signal of the alarm system if a door of the vehicle is locked within the period of time, and enable the second notification signal after expiration of the period of time; and if it is determined that the fastener is not fastened or the person is seated in the vehicle seat, reset the alarm system. Moreover, the invention encompasses a method for preventing leaving a child in an unattended vehicle. The method includes enabling a first notification signal of an alarm system when a fastener of a child seat is fastened, the child seat being located in the vehicle; resetting the alarm system when the person is seated in the driver's seat; thereafter, enabling a second notification signal of the alarm system for a period of time when the person is not seated in the driver's seat and the fastener of the child seat remains fastened; enabling a third notification signal of the alarm system when a driver's door of the vehicle is locked within the period of time; enabling the third notification signal of the alarm system after expiration of the period of time; and resetting the alarm system when the fastener of the child seat is unfastened.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Further features and advantages of the invention can be ascertained from the following detailed description that is provided in connection with the drawing(s) in the accompanying figures.

DETAILED DESCRIPTION OF THE PREFERRED EMBODIMENTS

The present disclosure relates generally to an alarm system and more particularly, to a method and system for to minimize or avoid the risk of (also referred to herein as "preventing") leaving a child in an unattended vehicle. It is understood, however, that specific embodiments are provided as examples to teach the broader inventive concept, and one of ordinary skill in the art can easily apply the teaching of the present disclosure to attain other methods or systems. In addition, it is understood that the methods and systems discussed in the present disclosure include some conventional features and/or processes. Since these features and processes are well known in the art, they will only be discussed in a general level of detail.

Figure 1:
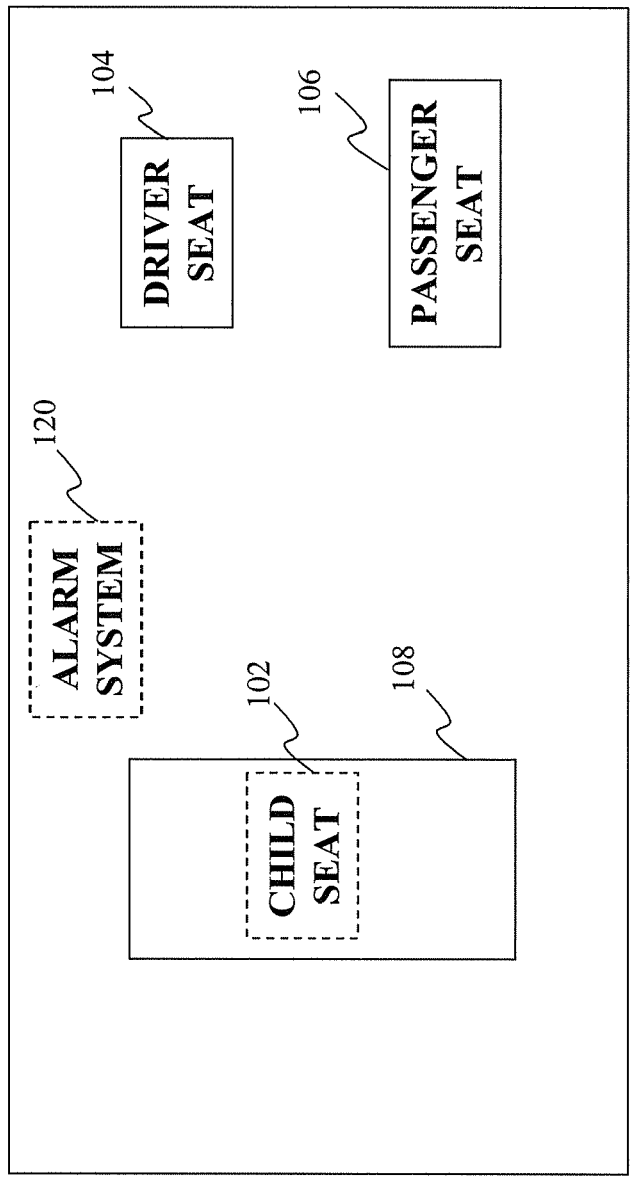
FIG. 1 is a diagrammatic view of a motor vehicle including a child safety seat that embodies aspects of the present disclosure.

Referring to FIG. 1, illustrated is a diagrammatic view of a motor vehicle 100 including a child safety seat 102 located therein. The vehicle 100 includes a driver seat 104, a passenger seat 106, and a back seat 108. The child seat 102 is securely positioned in the back seat 108 via a safety harness or belt provided in the vehicle 100. The harness or belt is preferably provided as standard equipment by a manufacturer of the vehicle. The child seat 102 includes a child seat belt with a buckle or other suitable type of fastener, such as a 5-point harness, for securing a child in the child seat. The child seat 102 further includes a sensor or detector that detects whether or not the child seat belt is fastened. The sensor may include an electrical sensor, electro-mechanical sensor, mechanical sensor, magnetic sensor, or any other suitable sensor known in the art. The child seat 102 further includes a connector for interfacing, via a wired connection, with an alarm system 120. The alarm system may, for example, be installed as original equipment or added as aftermarket equipment, although preferably it is factory installed in the vehicle 100 by the manufacturer. Accordingly, the alarm system 120 is provided with a signal indicating if the child seat belt is fastened or unfastened. Alternatively, the child seat 102 may optionally include a transmitter for interfacing, via a wireless connection, with the alarm system 120. The alarm system 120 is operatively coupled to various components in the vehicle 100 as discussed herein. The alarm system 120 is adapted and configured to activate one or more alerts when a child is left unattended in the child seat 102 in the vehicle 100.

Figure 2:
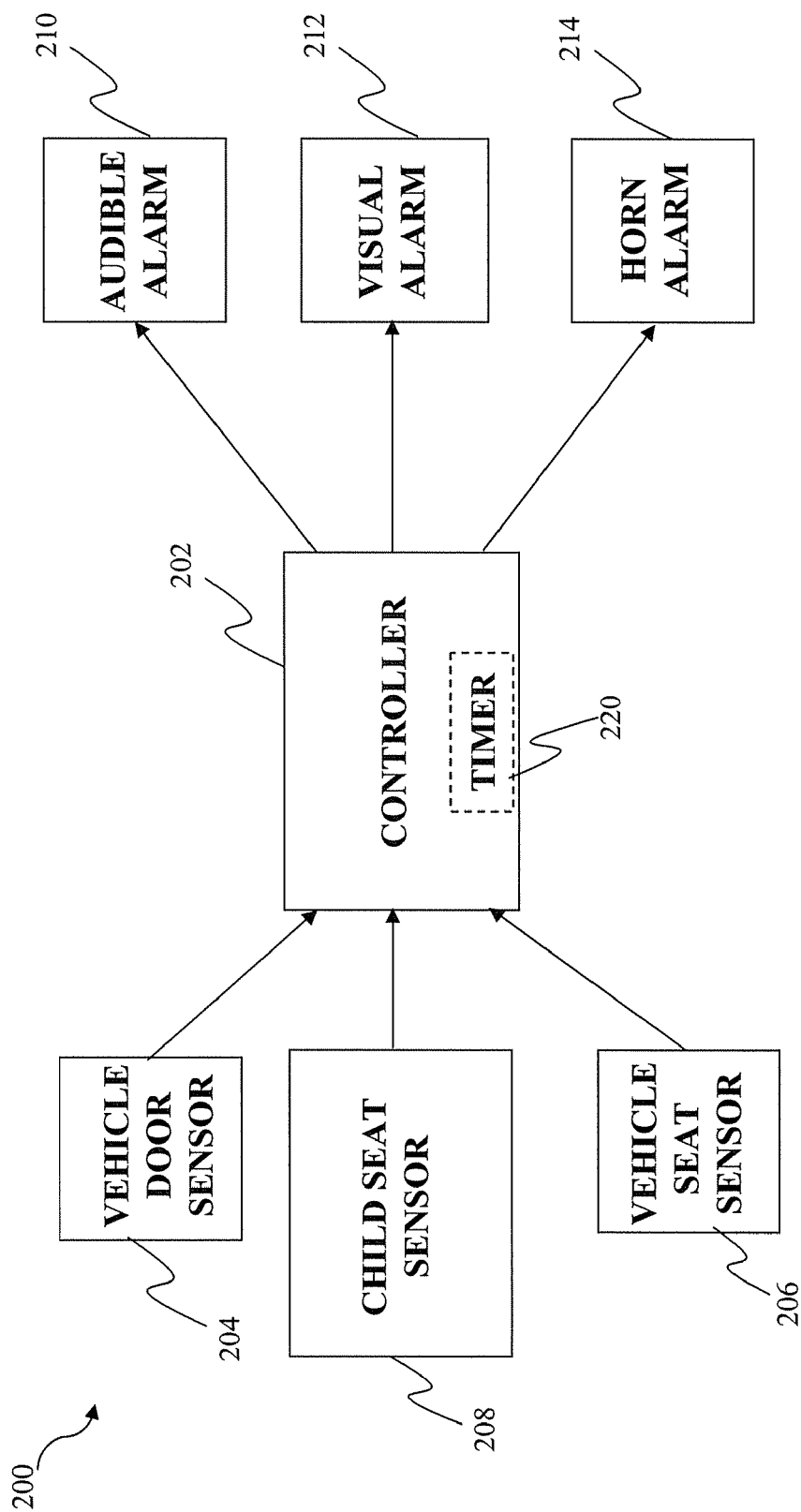
FIG. 2 is a block diagram of an alarm system that may be implemented in the vehicle of FIG. 1.

Referring to FIG. 2, illustrated is a block diagram of an alarm system 200 that may be implemented in the vehicle 100 of FIG. 1. The alarm system 200 is representative of the alarm system 120 of FIG. 1. The alarm system 200 includes a controller 202 for controlling the operation and functionality of the alarm system. The controller 202 may be a stand alone component or part of a control system of the vehicle 100 (of FIG. 1). The controller 202 may include a digital signal processor (DSP). The DSP may execute a software program that determines how the controller 202 controls the various components of the alarm system 200 and/or the vehicle 100. Alternatively, the DSP could be a microcontroller, or some other form of digital processor. As another alternative, the DSP may optionally be replaced with a state machine or hardwired circuit. The controller 202 is preferably operatively coupled to a vehicle door sensor 204, a vehicle seat sensor 206, and a child seat sensor 208. Accordingly, the sensors 204, 206, 208 provide signals to the controller 202 for operating the alarm system 200 as described herein.

The vehicle door sensor 204 may be provided by the vehicle manufacturer and detects whether a vehicle door is locked or unlocked. In the present embodiment, the vehicle door sensor 204 includes a driver door sensor that detects whether or not the driver door is locked. Alternatively, the vehicle door sensor 204 may also include a front passenger door sensor or a back passenger door sensor, or any combination of driver, passenger, or back door sensors. The vehicle seat sensor 206 may also be provided by the vehicle manufacturer and is adapted and configured to detect whether or not a person is seated in a vehicle seat. The vehicle seat sensor 206 may include, e.g., a weight sensor that is triggered when a person or large animal sits in the vehicle seat. In the present embodiment, the vehicle seat sensor 206 includes a driver seat sensor that detects whether or not a person is seated in the driver seat.

Alternatively, the vehicle seat sensor 206 may also include one or more passenger seat sensors. The child seat belt sensor 208 is representative of the sensor of the child safety seat 102 discussed in FIG. 1, and may be provided by the child seat manufacturer. As previously discussed in connection with FIG. 1, the child seat sensor 208 detects whether the buckle of the child seat belt is fastened or unfastened. It is understood that the various types of sensors discussed above are merely examples, and that other sensors having similar functionalities may also be used in connection with the alarm system 200.

The controller 202 is configured to enable an audible alarm 210, a visual alarm 212, a horn alarm 214, or any combination thereof, in a continuous or intermittent manner. Preferably, all three types of alarms are enabled simultaneously, although these can be sequentially enabled if desired The alarms 210, 212, 214 may be communicated by various components that are provided, preferably, by the vehicle manufacturer. For example, the audible alarm 210 may include various tones and sounds from a speaker system or other type of audio system. The visual alarm 212 may include a flashing indicator that is displayed in the dashboard and/or light indicators of the vehicle such as headlights, emergency lights, door lights, overhead lights, or the like, or any combination thereof. The horn alarm 214 may include known horn systems that are suitable for motor vehicles, and preferably includes the horn system already installed in the vehicle. Alternatively, the alarms 210, 212, 214 may optionally be communicated by various components provided by the child seat manufacturer or even a third party. Further, the controller 202 includes a timer 220 for providing a time delay of a pre-determined period of time. In one embodiment, the period of time is sufficient for a person to enter the vehicle and be seated in a vehicle seat after fastening the fastener of the child car seat. In other preferred embodiments, the time period may be from about 1 minute to about 5 minutes or about 2 minutes to 4 minutes. The timer may be varied and may be set by a vehicle manufacturer or a user of the vehicle.

Figure 3:
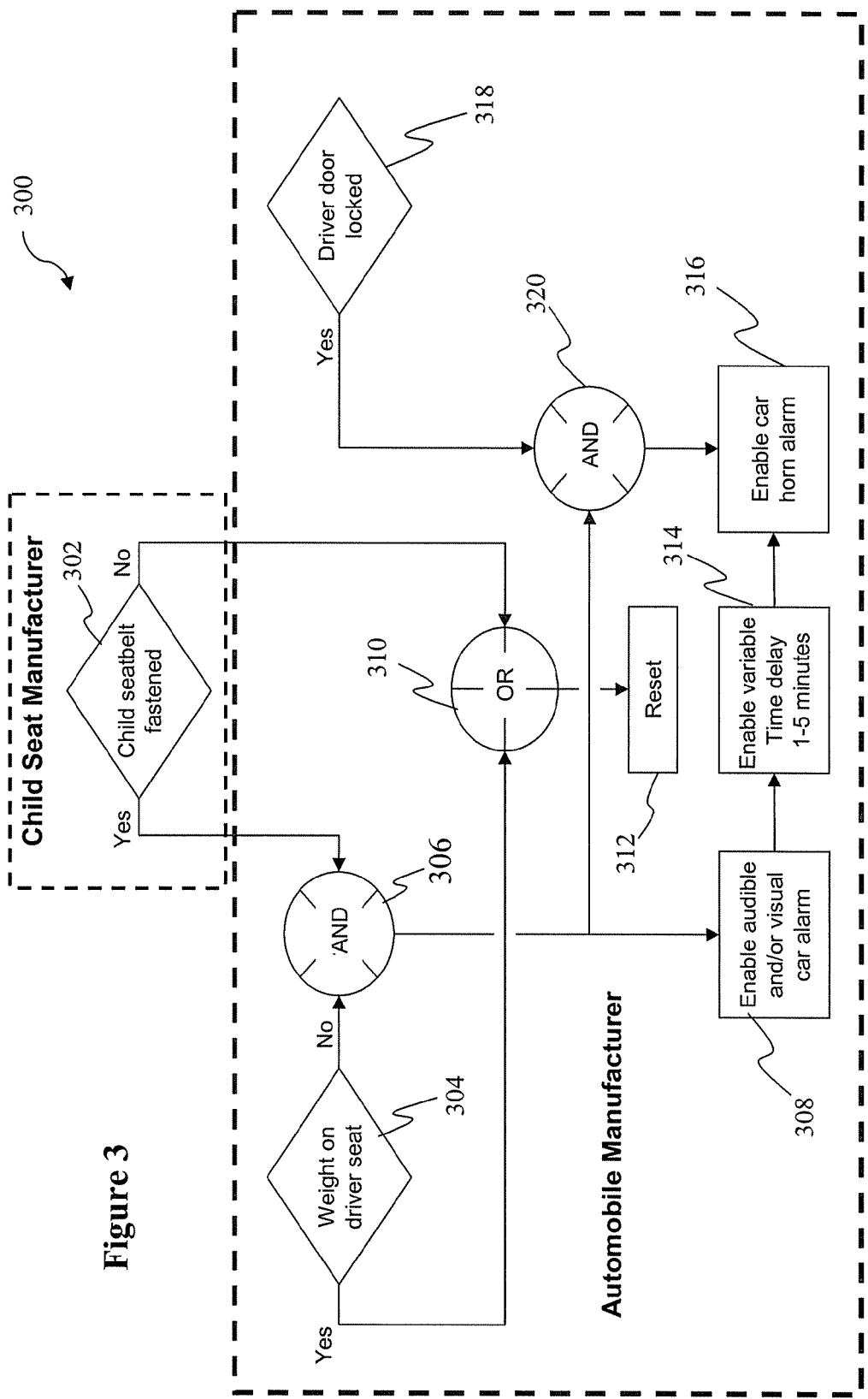
FIG. 3 is a flowchart of a method that may be implemented in the alarm system of FIG. 2.

Referring also to FIG. 3, illustrated is a flowchart of a method 300 that may be implemented in the alarm system 200 of FIG. 2. The method 300 may be implemented in software, hardware, and/or firmware and executed by the controller 202 of the alarm system 200. The method 300 includes determining whether the child seat belt buckle is fastened or unfastened (block 302). This determination will likely indicate whether or not a child is secured in the child seat within the vehicle. The method further includes determining whether a person is seated in a vehicle seat such as the driver seat (block 304).

If the child seat buckle is fastened and the person is not seated in the vehicle seat (block 306), an audible alarm, a visual alarm, or combination thereof is typically enabled to notify a person that a child remains in the car seat (block 308). If the child seat buckle is not fastened, or the person is seated in the vehicle seat (block 310), the alarm system may be reset such that all alarms of the alarm system are disabled or deactivated (block 312). The system may, for example, then be reactivated when one of those conditions changes or may be automatically reactivated after a time delay or upon another condition.

According, when the person is not seated in the vehicle and the child seat buckle is fastened (such as when the person initially secures the child in the child seat or when the person is exiting the vehicle), the alarm system may enable the audible alarm, the visual alarm, or combination thereof to notify nearby person(s) that the child is in the car seat (block 308). Also, when the person is seated in the vehicle seat, the alarm system may disable the alarm (block 312) that was enabled (block 308) when the child seat belt buckle was initially fastened. This action may test the operation of the alarm system and indicate to the person that the alarm system is operating properly.

The method 300 further includes enabling a time delay for a pre-determined period of time such as from about 1 minute to about 5 minutes (block 314). After the expiration of the pre-determined period of time, the alarm system may enable a horn alarm to further remind the person that the child is in the child seat (block 316). The delay, when implemented, is typically configured to permit a driver or passenger sufficient time to enter the vehicle and fasten their buckle before the alarm is initiated, which will prevent the alarm form being activated immediately upon fastening a child in the child seat. If after placing a child in the child seat and a vehicle door such as the driver door is locked within a pre-determined period of time (block 318) and the child seat belt buckle is fastened and no one is in the vehicle seat (block 320), the alarm system may activate the horn alarm or one of the other alarms to further remind the person that the child is in the child seat (block 316). The horn alarm is preferably enabled in a manner that will likely cause the person to take action such as unfastened the child seat belt buckle to remove the child from the child seat. When the child seat belt buckle is unfastened, the alarm system may reset, such that all alarms are disabled or deactivated (block 312).

It is understood the processing sequence described in FIG. 3 is provided for illustrative purposes only as one preferred embodiment and is not intended to denote serialization of the described processing steps. In various embodiments, the processing steps described in FIG. 3 may be performed in varying order and may be performed in parallel with other depicted processing steps.

In summary, the method and system disclosed herein is adapted and configured to detect when the seat belt of the child seat is fastened which is indicative of a child being secured in the child seat. The alarm system may activate an audible alarm and/or visual alarm to indicate that the child is in the child seat. When the person sits in the driver or other passenger seat, the alarm system may reset and deactivate the audible and/or visual alarm thereby indicating to the person that the alarm system is operating properly. The person may proceed to drive the vehicle to a desired destination. When the person exits the vehicle, the alarm system detects that the person is not sitting in the driver seat and the seat belt of the child seat remains fastened. The alarm system may activate the audible alarm and/or visual alarm to indicate to the person that the child is in the child seat. If the person is not responsive to the alarm, a timer can be set for a pre-determined period of time that is independent of the pre-set period of time when the child is first buckled into a child car seat. If the alarm system detects that the driver door is locked within the pre-determined period of time, typically after the seat sensor indicates the person has left the vehicle, one of the alarms such as a horn alarm may be activated in such a manner as to remind the person that the child is in the child seat and cause the person to take remedial action. Further, the alarm system may activate the horn alarm, or one or more of the other alarms, after the expiration of the pre-determined period of time in a similar manner. The alarm system may reset and deactivates the alarm when the child seat belt is unfastened.

Thus, a method for use with a child seat in a vehicle is provided which includes determining whether a fastener of the child seat is fastened; determining whether a person is seated in a vehicle seat; if it is determined that the child seat fastener is fastened and the person is not seated in the vehicle seat: enabling a first notification signal of an alarm system, optionally but preferably enabling a delay of the alarm system for a period of time, optionally but preferably enabling a second notification signal of the alarm system if a door of the vehicle is locked within the period of time, and enabling the second notification signal after expiration of the period of time; and if it is determined that the fastener is not fastened or the person is seated in the vehicle seat, resetting the alarm system. In some embodiments, the step of resetting the alarm system includes disabling all notification signals that were previously enabled, thereby indicating that the alarm system is operating properly. In other embodiments, the method includes configuring the first notification signal to include an audible alarm signal, a visual alarm, or combination thereof.

In some other embodiments, the method includes configuring the second notification signal to include a horn alarm signal. In other embodiments, the method includes selecting the period of time to be from about 1 minute to 5 minutes. In still other embodiments, the step of determining includes determining whether the person is seated in a driver seat of the vehicle. In other embodiments, the step of enabling the second notification signal includes enabling the second notification signal if a driver door of the vehicle is locked within the period of time.

Also, a system for use with a child seat in a vehicle is provided which includes a first detector for detecting whether a fastener of a child seat is fastened, a second detector for detecting whether a person is seated in a vehicle seat, a third detector for detecting whether a door of the vehicle is locked, and a controller that is configured to: determine whether the fastener of the child seat is fastened; determine whether the person is seated in the vehicle seat; if it is determined that the fastener is fastened and the person is not seated in the vehicle seat: enable a first notification signal of an alarm system, enable a delay of the alarm system for a period of time, enable a second notification signal of the alarm system if a door of the vehicle is locked within the period of time, and enable the second notification signal after expiration of the period of time; and if it is determined that the fastener is not fastened or the person is seated in the vehicle seat, reset the alarm system.

In some embodiments, the controller is configured to reset the alarm system by disabling all notification signals that were previously enabled thereby indicating that the alarm system is operating properly. In other embodiments, the first notification signal includes an audible alarm signal, a visual alarm signal, or combination thereof. In some other embodiments, the second notification signal includes a horn alarm signal. In still other embodiments, the period of time is between from about 1 minute to 5 minutes. In other embodiments, the second detector detects whether the person is seated in a driver seat. In some other embodiments, the third detector detects whether a driver door is locked.

Additionally, a method for preventing leaving a child in an unattended vehicle is provided that includes enabling a first notification signal of an alarm system when a fastener of a child seat is fastened, the child seat being located in the vehicle, resetting the alarm system when the person is seated in the driver's seat, thereafter, enabling a second notification signal of the alarm system for a period of time when the person is not seated in the driver seat and the fastener of the child seat remains fastened, enabling a third notification signal of the alarm system when a driver door of the vehicle is locked within the period of time, enabling the third notification signal of the alarm system after expiration of the period of time, and resetting the alarm system when the fastener of the child seat is unfastened.

In some embodiments, the first notification signal is one of a visual alarm signal, an audible alarm signal, and combinations thereof. In other embodiments, the second notification signal is one of a visual alarm signal, an audible alarm signal, and combinations thereof. In some other embodiments, the third notification signal is a horn alarm signal. In still other embodiments, the method includes maintaining the first notification signal enabled until the person is seated in the driver's seat. In other embodiments, the method includes maintaining the third notification signal enabled until the fastener of the child seat is unfastened. In all embodiments of the invention, the first, second, and third notification signal may be the same or different, or the same type, although preferably the second notification signal, third notification signal, or both are different from the first notification signal if they are enabled or activated concurrently thereto.

The term "about," as used herein, should generally be understood to refer to both numbers in a range of numerals. Moreover, all numerical ranges herein should be understood to include each whole integer within the range.

The term "buckle," as used herein, typically refers to a seat belt buckle, although it should be understood to refer to any device suitable for fastening to held retain the occupant in place in their seat in the vehicle.

Although several embodiments have been illustrated and/or described in detail, it will be understood that they are exemplary, and that a variety of substitutions and alterations are possible without departing from the spirit and scope of the present invention, as defined by the following claims. For example, the various different combinations of the above-listed steps can be used in various sequences or in parallel. Further, the specific examples of the sensors and detectors that are utilized in the various embodiments disclosed herein may include devices known in the art or later developed.

What is claimed is:

1. A method for use with a child seat in a vehicle using a controller, the method comprising:
   determining whether a fastener of the child seat is fastened;
   determining whether a person is seated in a vehicle seat;
   if it is determined that the child seat fastener is fastened and the person is not seated in the vehicle seat:
   enabling a first notification signal of an alarm system;
   enabling a delay of the alarm system for a period of time;
   enabling a second notification signal of the alarm system if a door of the vehicle is locked within the period of time; and
   enabling the second notification signal after expiration of the period of time; and
   if it is determined that the child seat fastener is not fastened or the person is seated in the vehicle seat, resetting the alarm system.

2. The method of claim 1, wherein the resetting the alarm system includes disabling all notification signals that were previously enabled thereby indicating that the alarm system is operating properly.

3. The method of claim 1, including configuring the first notification signal to be an audible alarm signal, a visual alarm, or combination thereof.

4. The method of claim 1, including configuring the second notification signal to be a horn alarm signal.

5. The method of claim 1, including selecting the period of time to be from about 1 minute to 5 minutes.

6. The method of claim 1, wherein the determining includes determining whether the person is seated in a driver seat of the vehicle.

7. The method of claim 6, wherein the enabling the second notification signal includes enabling the second notification signal if a driver door of the vehicle is locked within the period of time.

8. A system for use with a child seat in a vehicle, the system comprising a first detector for detecting whether a fastener of the child seat is fastened, a second detector for detecting whether a person is seated in a vehicle seat, a third detector for detecting whether a door of the vehicle is locked, and a controller that is configured to:
   determine whether the fastener of the child seat is fastened;
   determine whether the person is seated in the vehicle seat;
   if it is determined that the fastener is fastened and the person is not seated in the vehicle seat:
   enable a first notification signal of an alarm system;
   enable a delay of the alarm system for a period of time;
   enable a second notification signal of the alarm system if a door of the vehicle is locked within the period of time; and
   enable the second notification signal after expiration of the period of time; and
   if it is determined that the fastener is not fastened or the person is seated in the vehicle seat, reset the alarm system.

9. The system of claim 1, wherein the controller is configured to reset the alarm system by disabling all notification signals that were previously enabled thereby indicating that the alarm system is operating properly.

10. The system of claim 1, wherein the first notification signal includes an audible alarm signal, a visual alarm signal, or combination thereof.

11. The system of claim 1, wherein the second notification signal includes a horn alarm signal.

12. The system of claim 1, wherein the period of time is from about 1 minute and 5 minutes.

13. The system of claim 1, wherein the second detector detects whether the person is seated in a driver seat.

14. The system of claim 1, wherein the third detector detects whether a driver door is locked.

15. A method for preventing leaving a child in an unattended vehicle using a controller, the method comprising:
   enabling a first notification signal of an alarm system when a fastener of a child seat is fastened, the child seat being located in the vehicle;
   resetting the alarm system when a person is seated in the driver seat;
   thereafter, enabling a second notification signal of the alarm system for a period of time when the person is not seated in the driver seat and the fastener of the child seat remains fastened;
   enabling a third notification signal of the alarm system when a driver door of the vehicle is locked within the period of time;
   enabling the third notification signal of the alarm system after expiration of the period of time; and
   resetting the alarm system when the fastener of the child seat is unfastened.

16. The method of claim 15, wherein the first notification signal is one of a visual alarm signal, an audible alarm signal, and combinations thereof.

17. The system of claim 15, wherein the second notification signal is one of a visual alarm signal, an audible alarm signal, and combinations thereof.

18. The method of claim 15, wherein the third notification signal is a horn alarm signal.

19. The method of claim 15, including maintaining the first notification signal enabled until the person is seated in the driver seat.

20. The method of claim 15, including maintaining the third notification signal enabled until the fastener of the child seat is unfastened.

* * * * *